(12) United States Patent
Schmierer

(10) Patent No.: US 8,662,723 B2
(45) Date of Patent: Mar. 4, 2014

(54) METHOD TO ASSEMBLE A TURN SIGNAL INDICATOR MODULE AND TURN SIGNAL INDICATOR SUB-MODULE

(75) Inventor: Arne Schmierer, Kirchheim/Teck (DE)

(73) Assignee: SMR Patents S.a.r.l., Luxembourg (LU)

( * ) Notice: Subject to any disclaimer, the term of this patent is extended or adjusted under 35 U.S.C. 154(b) by 507 days.

(21) Appl. No.: 12/948,224

(22) Filed: Nov. 17, 2010

(65) Prior Publication Data

US 2011/0122647 A1    May 26, 2011

(30) Foreign Application Priority Data

Nov. 17, 2009 (DE) .................................. 09176196

(51) Int. Cl.
*B60Q 1/28* (2006.01)
*F21V 9/00* (2006.01)

(52) U.S. Cl.
USPC ............................ 362/494; 362/511; 362/540

(58) Field of Classification Search
USPC ........................... 362/494, 511, 540, 602–605
See application file for complete search history.

(56) References Cited

U.S. PATENT DOCUMENTS 7,111,972 B2 * 9/2006 Coushaine et al. ........... 362/625
7,255,464 B2 8/2007 Barros et al.
7,510,311 B2 * 3/2009 Romas et al. ................. 362/494
2008/0232127 A1 * 9/2008 Futami .......................... 362/511
2012/0147617 A1 * 6/2012 Fritz et al. .................... 362/511

FOREIGN PATENT DOCUMENTS

| EP | 0858932 | 8/1998 |
| EP | 1022187 | 7/2000 |
| EP | 1391348 A2 | 2/2004 |
| EP | 1657488 | 5/2006 |
| EP | 1726480 | 11/2006 |
| JP | 2006114309 | 4/2006 |
| JP | 2007250290 | 9/2007 |

OTHER PUBLICATIONS

European Search Report for Application No. EP 09 17 6196 dated Mar. 12, 2010.

* cited by examiner

*Primary Examiner* — Bao Q Truong
(74) *Attorney, Agent, or Firm* — Reising Ethington P.C.

(57) ABSTRACT

The invention is related to a method for assembly a turn signal indicator module mounted into a rear view mirror comprising a housing. A LED, a light guide and a lens of the turn signal indicator module are mounted in steps as: Mounting the LED on a printed circuit board, fixing the printed circuit board at the light guide to define a strict relation between the LED and the light guide and mounting the light guide, the lens and the housing to form a turn signal indicator module.

10 Claims, 2 Drawing Sheets

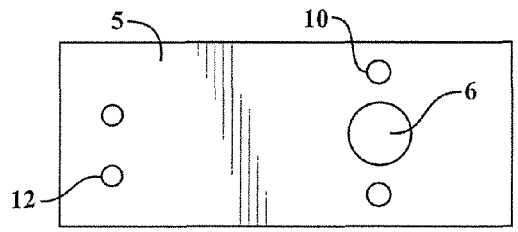
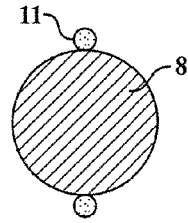
FIG. 3A            FIG. 3B
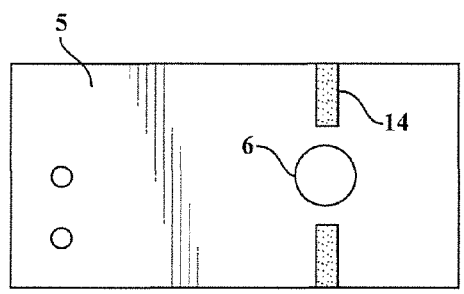
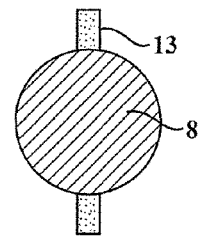
FIG. 4A            FIG. 4B
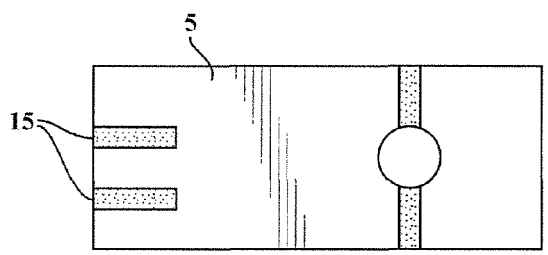
FIG. 5
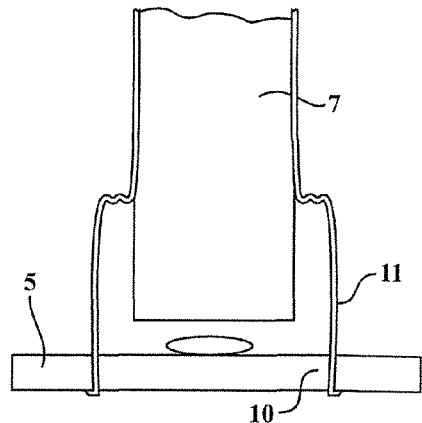
FIG. 6

US 8,662,723 B2
METHOD TO ASSEMBLE A TURN SIGNAL INDICATOR MODULE AND TURN SIGNAL INDICATOR SUB-MODULE

The invention is based on a priority patent application EP 09176196.5 which is hereby incorporated by reference.

BACKGROUND ART

1. Field of the Invention

The invention is related to a method to assemble a turn signal indicator that is installed into a rear view mirror. More especially the invention is also related to a light guide sub module that is mounted with a lens and inserted in an opening of the mirror head cover or between mirror cover elements.

2. Description of The Related Art

Solutions with turn signal indicators in the mirror head of an exterior rear view mirror are known since long. The first solutions comprised signal light bulbs placed at different positions of the rear view mirror. With the availability of LEDs as light sources for turn signal indication also devices with light guides are disclosed.

In the U.S. Pat. No. 7,255,464 a lot of different rear view mirror designs are disclosed using in some embodiments a light guide to emit light in forward direction of the vehicle.

In the embodiments of FIG. 98 and FIG. 99 of this prior art a design is shown with a light guide and additional LED sources positioned along the light guide.

In EP1391348 A2 a LED is mounted in a hole of a light guide. The small printed circuit board is also hosted in the mounting hole. The light guide does not have special protrusions to fix printed circuit board and light guide.

The need in automotive supply industry to reduce costs results in solutions with a single LED as light source for a turn signal indicator with a light guide. The LED is positioned at one end of the light guide. A solution using a LED and a light guide is shown in EP0858932. In this assembly and in common production processes the single LED is mounted on a printed circuit board that is fixed to the housing of the turn signal indicator module. To mount the printed circuit board in the housing has the advantage that the contact to electrical harness can be provided easily.

During assembly the light guide with the integrated lens is vibration-welded to the housing closing the module. The welding process works independent from the position of the LED and results in a deviation form optimum of LED to light guide end face allocation.

There is a need to improve the production process in an easy and cost saving way and to optimize the spatial relation between LED and light guide during production.

The light of a single LED or of a small amount of LEDs must be efficiently fed into the light guide. Any deviation results in a reduction of light power emitted through the light guide decoupling means.

SUMMARY OF THE INVENTION

The turn signal indicator module according the invention is assembled by mounting the printed circuit board with the attached LED at the light guide.

In a further step the light guide-LED combination is welded with the housing. The advantage is a defined illumination of the illumination area of the turn signal indicator for the coupling of light source and light guide is improved. For the series process an easy way of implementing a precise mounting is achieved.

BRIEF DESCRIPTION OF THE DRAWINGS

The invention is shown in the figures and shortly described there after.

FIGS. 3A and 3B show a cross section of printed circuit board and light guide, respectively;

FIGS. 4A and 4B show an alternative cross section of a printed circuit board and light guide, respectively;

FIG. 5 shows a cross section of another embodiment; and

FIG. 6 shows a cross section along the length of the light guide.

DETAILED DESCRIPTION OF THE DRAWINGS

Figure 1A:
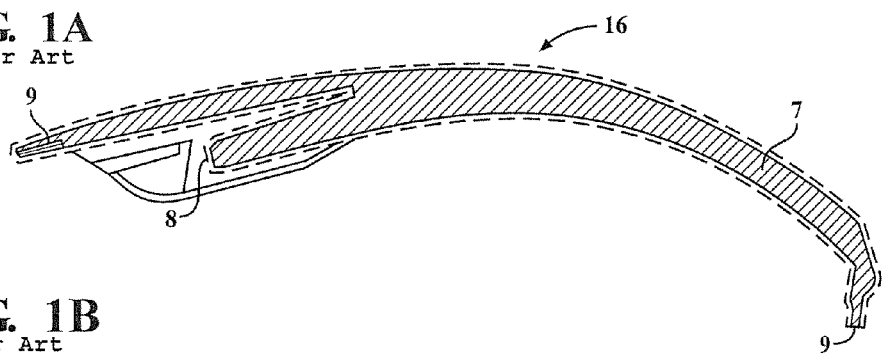
FIGS. 1A and 1B show a turn signal indicator module as in prior art.
Figure 1B:
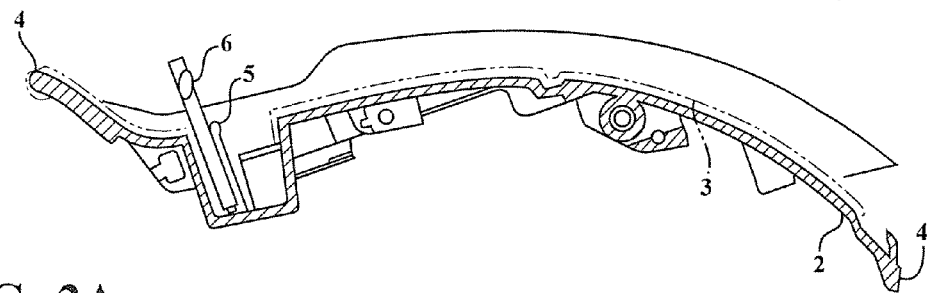
Figure 2A:
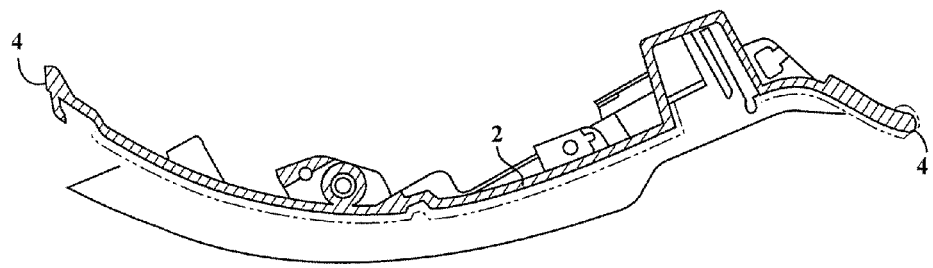
FIGS. 2A and 2B show a module according the invention
Figure 2B:
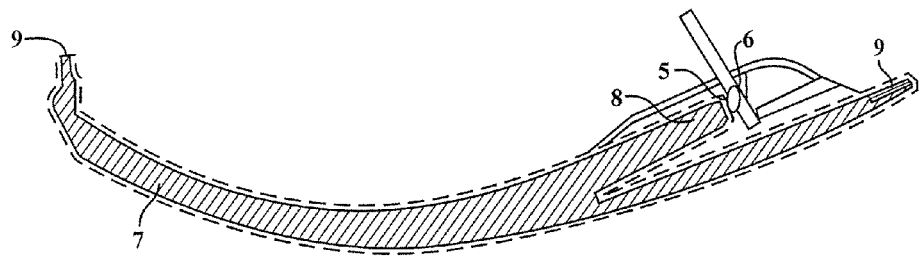

FIGS. 1A and 1B show a solution for a turn signal indicator as it is in prior art. The known turn signal indicator module 1 consists of two main parts, and so does a respective module according to the invention as shown in FIGS. 2A and 2B. One of the parts comprises a light guide 7, see FIGS. 1A and 2B, and the other one a housing, see FIGS. 1B and 2A. According to the invention there is a sub-assembly of a light guide 8 and a circuit board 5, with FIGS. 3B and 4B showing details of the respective light guide 8 and FIGS. 3A and 4A showing details of the respective circuit board 5.

The base is a housing 2 that includes for example a reflector 3 or an iris and a printed circuit board 5. The printed circuit board 5 comprises electrical wiring and circuits and at least one LED 6. The LED 6 can be mounted on the printed circuit board by different methods as SMD, chip on board device or thru hole device.

The printed circuit board is mounted in an indentation in the housing. The electrical contacts are made by connectors and pins that are directed to the electrical harness of the rear view mirror.

The cover of the housing is a lens 7 that forms an integrated light guide in this embodiment. The light guide ends in an end face 8, which is prepared to couple in the light of the LED 6. During assembly of the device the cover part with the light guide and the housing 2 are welded together. The preferred method is to use a vibration welding process to melt the edges of the housing 4 and of the edges of the cover 9.

The welding process is not controlled and by accident it fails to position the LED 6 exactly in front of the light guide end face 8. The vibrations applied move the lens versus the housing to achieve the energy to melt the plastic part at the edges. Through the move the most relevant position of LED and light guide are finally fixed but in a certain tolerance range.

The same process is used to close the turn signal indicator module if a separate light guide is used. The light guide is either mounted in front of the lens or in the housing. Also in an embodiment with a separate light guide the relation between LED position on the printed circuit and the end face of the light guide is not well adapted.

FIG. 2 shows the inventional solution with an assembly process that helps to overcome the problems of clearly related positions between at least one LED and a light guide. The lens with integrated light guide 7 is equipped first of all with the printed circuit board 6, so that the LED 5 is fixed in the optimal position in front of the end face 8 of the light guide. After this assembly step the lens/light guide and the housing 2 are welded together. The vibration welding process does no longer influence the spatial relationship between LED and Light guide end face.

To achieve the optimal relation between printed circuit board and mounted LED 5 and the light guide 7 both parts are adapted to form a conjunction.

Light guide and printed circuit board forms a light guide sub module that can be assemble with lens and housing.

In FIG. 3 a first embodiment of printed circuit board and light guide are shown schematically.

The printed circuit 5 comprises contact pins 12 and a LED 6. Adjacent to the LED 6 leading means 10 are implemented. The light guide has projections 11 that fit to the leading means 10 of the printed circuit board. In a first assembly step the printed circuit board 5 is fitted to the light guide projection means.

In another embodiment projections and leading means are adapted to form a snap-fit connection between the two devices.

Alternatively the connection is realized by hot-riveting.

FIG. 4 shows another embodiment that uses bump faces 14 and 13 that allow to weld or to glue the devices together.

The position of the bump faces relatively to the LED can derive from the shown embodiment. Also solutions with bump faces in other angles than 180° are useful. The use of more than two bump faces is possible.

A further improvement is shown in FIG. 5. The printed circuit board has flat lead connectors 15 that are connected to counterparts in the housing 2. So the spatial deviation that are formerly occur between the LED and the light guide are now only occurring in the electrical connection which is less critical and can be handled.

FIG. 6 shows a cross section along the light guide 7. Schematically the projections 11 are shown that fit into the leading means 10 of the printed circuit board. LED 6 mounted on the surface of the printed circuit board is positioned perfectly in front of the end facet of the light guide.

I claim:

1. Method for assembly a turn signal indicator module mounted into a rear view mirror comprising a housing, at least one LED and at least one light guide with an end face for coupling in the light of the LED and a lens that covers the turn signal indicator module wherein the following steps are realized:

mounting the at least one LED on a printed circuit board;

fixing the printed circuit board so that the LED is fixed in the optimal position in front of the end face at the light guide to define a strict relation between the at least one LED and the light guide using connection means with the light guide forming projections adapted to lead the light guide in the printed circuit board by leading means and fixing it, and mounting the light guide with integrated lens and the printed circuit board to the housing to form a turn signal indicator module.

2. Method according to claim 1, characterized in that the light guide and the printed circuit board are connected by a clips mechanism, with the projections of the light guide forming hooks for a snap-fit connection to the circuit board.

3. Method according claim 1 characterized in that the light guide and the printed circuit board are connected by a clips mechanism.

4. Method according claim 1 characterized in that the light guide and the printed circuit board are connected by gluing.

5. Method according claim 1 characterized in that the light guide and the printed circuit board are connected by hot-riveting.

6. Method according claim 1 characterized in that the light guide and the printed circuit board are connected by welding.

7. Light guide sub module to be mounted into a rear view mirror comprising a housing, at least one LED and at least one light guide and a lens that covers the turn signal indicator module wherein the following steps are realized:

mounting the at least one LED on a printed circuit board;

fixing the printed circuit board at the light guide to define a strict relation between the at least one LED and the end face of the light guide using connection means;

mounting the light guide, the lens and the housing to form a turn signal indicator module, characterized in that the at least one LED and the end face of the light guide are connected by protrusive connection means; and wherein the step of fixing the light guide to the printed circuit board includes the step of leading the light guide to a position for assembly using light guide projections adapted to lead the light guide by insertion of the light guide projections into leading means of the printed circuit board and snap fitting the light guide projections into the printed circuit board.

8. Light guide sub module according claim 7 characterized in that the projections of the light guide forms hooks for a snap-fit connection to the circuit board.

9. Light guide sub module according claim 7 characterized in that the light guide forms gluing faces to be glued to bumps of the printed circuit board.

10. Light guide sub module according claim 7 characterized in that the light guide forms welding faces to be welded to bumps of the printed circuit board.

* * * * *